United States Patent
Chen et al.

(10) Patent No.: US 12,459,002 B2
(45) Date of Patent: Nov. 4, 2025

(54) ULTRASONIC TRANSDUCER

(71) Applicant: Unictron Technologies Corporation, Hsin-Chu (TW)

(72) Inventors: Lung Chen, Taipei (TW); Yi-Ting Su, Hsinchu (TW); Yen-Chuan Chen, Hsinchu County (TW)

(73) Assignee: Unictron Technologies Corporation, Hsin-Chu (TW)

( * ) Notice: Subject to any disclaimer, the term of this patent is extended or adjusted under 35 U.S.C. 154(b) by 770 days.

(21) Appl. No.: 17/748,020

(22) Filed: May 18, 2022

(65) Prior Publication Data

US 2023/0182173 A1      Jun. 15, 2023

(30) Foreign Application Priority Data

Dec. 15, 2021   (TW) ................................. 110146901

(51) Int. Cl.
  *B06B 1/06*      (2006.01)
  *H10N 30/50*      (2023.01)

(52) U.S. Cl.
  CPC .......... *B06B 1/0603* (2013.01); *B06B 1/0681* (2013.01); *H10N 30/505* (2023.02); *B06B 2201/55* (2013.01)

(58) Field of Classification Search
  CPC . B06B 1/0603; B06B 1/0681; B06B 2201/55; H10N 30/505

(Continued)

(56) References Cited

U.S. PATENT DOCUMENTS

| 5,741,971 A * | 4/1998 | Lacy ...................... G01N 29/32 |
| | | 73/152.16 |
| 2002/0007118 A1* | 1/2002 | Adachi ............... G01S 15/8922 |
| | | 600/443 |

(Continued)

FOREIGN PATENT DOCUMENTS

| CN | 1908696 A | 2/2007 |
| CN | 102823006 A | 12/2012 |

(Continued)

OTHER PUBLICATIONS

Machine translation of CN 210781302 U, Jun. 16, 2020, Ni et al.*

*Primary Examiner* — Bumsuk Won
(74) *Attorney, Agent, or Firm* — Winston Hsu (57) ABSTRACT

An ultrasonic transducer, including a piezoelectric element with physical characteristics of radial resonant frequencies and thickness resonant frequencies, and with an upper surface and a lower surface opposite to each other through the piezoelectric element and a lateral surface connecting the upper surface and the lower surface, and an acoustic matching layer set on the upper surface of the piezoelectric element and having a first resonant matching part and a second resonant matching part, wherein a thickness of the first resonant matching part in a direction perpendicular to the upper surface is greater than a thickness of the second resonant matching part in the direction, and the thickness of the first resonant matching part matches one radial resonant frequency of the piezoelectric element and the thickness of the second resonant matching part matches another radial resonant frequency or one of the thickness resonant frequency of the piezoelectric element.

20 Claims, 10 Drawing Sheets

(58) Field of Classification Search
USPC .......................................................... 310/322
See application file for complete search history.

(56) References Cited

U.S. PATENT DOCUMENTS

| | | | | |
|---|---|---|---|---|
| 2004/0174095 A1* | 9/2004 | Bhardwaj | ............... | H04R 17/00 |
| | | | | 310/334 |
| 2005/0194865 A1* | 9/2005 | Angelsen | .............. | B06B 1/0692 |
| | | | | 310/334 |
| 2005/0236932 A1* | 10/2005 | Nagahara | ................ | G01F 1/662 |
| | | | | 310/334 |
| 2006/0043836 A1* | 3/2006 | Tessien | ................ | G10K 15/043 |
| | | | | 310/323.12 |
| 2008/0303381 A1* | 12/2008 | Yuuya | ...................... | C08K 3/22 |
| | | | | 427/221 |
| 2011/0196405 A1* | 8/2011 | Dietz | ............. | A61B 17/320068 |
| | | | | 606/169 |
| 2012/0163126 A1* | 6/2012 | Campbell | ............. | B06B 1/0614 |
| | | | | 367/137 |
| 2012/0253199 A1* | 10/2012 | Aoki | .................... | A61B 8/4494 |
| | | | | 600/459 |
| 2015/0105663 A1* | 4/2015 | Kiyose | .................... | B06B 1/067 |
| | | | | 29/25.35 |
| 2018/0243794 A1* | 8/2018 | Buckland | ............. | G01N 29/245 |
| 2019/0342654 A1* | 11/2019 | Buckland | ............... | G10K 11/02 |
| 2020/0061677 A1* | 2/2020 | Nakano | ..................... | B08B 3/12 |
| 2020/0253584 A1* | 8/2020 | Morimoto | ............. | B06B 1/0674 |
| 2020/0376520 A1* | 12/2020 | Chen | ................. | B06B 1/0648 |

FOREIGN PATENT DOCUMENTS

| | | |
|---|---|---|
| CN | 210533396 U | 5/2020 |
| CN | 111796291 A | 10/2020 |
| CN | 112393753 A | 2/2021 |
| EP | 0 631 272 A2 | 12/1994 |
| JP | 2004-264221 A | 9/2004 |
| JP | 2004-349973 A | 12/2004 |
| TW | M572267 U | 1/2019 |
| TW | M628506 U | 6/2022 |

* cited by examiner

ULTRASONIC TRANSDUCER

BACKGROUND OF THE INVENTION

1. Field of the Invention

The present invention relates generally to an ultrasonic transducer, and more specifically, to an ultrasonic transducer having an acoustic matching layer with a first resonant matching part and a second resonant matching part for matching different resonant modes.

2. Description of the Prior Art

Current ultrasonic transducer may be used in short-range object detection. Through calculation of the time of flight (ToF) between emitting waves and reflected waves from objects, the distance between the ultrasonic transducer and detected object may be obtained. In the field of ultrasonic detection, the types and properties of objects to be detected is not quite restrictive. Solid, liquid or particle with various surface colors, transparencies and hardness may all be detected by using the ultrasonic transducer. Therefore, the ultrasonic transducer nowadays is widely used in the fields like parking sensors, level sensors, multiple sheet detection and flow meter.

The main component of an ultrasonic transducer is piezoceramics element, for example, the ceramic element made of lead zirconate titanate (PZT) material with two opposite surfaces coated with conductive layers to apply high-frequency alternating current signal in the operation, so that the piezoceramics would generate high-frequency vibration. This high-frequency vibration is a kind of wave energy. It may be in a form of ultrasonic wave, i.e. ultrasonic vibration, if its wavelength falls within the range of ultrasound. However, in order to transmit the generated ultrasonic waves from the piezoceramics into air, the acoustic impedances of piezoceramics and air should be matched.

The formula to calculate the acoustic impedance (Z) is $Z=\rho \cdot c$ ($\rho$=material density, c=ultrasound velocity). The acoustic impedance of piezoceramics is about 30-35 MRayl ($10^6$ kg/m$^2 \cdot$S), while the acoustic impedance of air is about 430 Rayl (kg/m$^2 \cdot$S). Since there is a huge gap between the acoustic impedances of piezoceramics and air, the ultrasonic energy generated by the piezoelectric can't be transmitted to air. Therefore, the acoustic matching layer becomes a critical component in ultrasonic transducers. The acoustic matching layer is designed to be set between the piezoceramics and air to match the acoustic impedances thereof, so that the ultrasonic wave may be effectively transmitted to air. The ideal value of acoustic impedance for the acoustic matching layer used in ultrasonic air transducer is $\sqrt{(35M \cdot 430)}$ Rayl, i.e. about 0.12 MRayl. However, it is difficult to find a durable material with acoustic impedance lower than 1 MRayl in nature. Therefore, commonly-used material of the acoustic matching layer in transducer industry is composite material with mixed polymer resin and hollow glass particles, to achieve lower acoustic impedance, and at the same time, provide better weatherability and reliability.

In another aspect, common piezoceramics may have different resonant modes, ex. radial resonant mode or thickness resonant mode in different settings. The ultrasonic wave emitted by piezoceramics in different resonant modes would have different frequencies, and common acoustic matching layer can't match the waves emitted by the piezoceramics in different resonant modes at the same time. Therefore, it is still necessary for those of skilled in the art to research and develop the acoustic matching layer capable of being applied in different resonant modes of piezoceramics.

The disclosure of the above background art is only for assisting the understanding of the concept and technical solution of the present application, and does not necessarily belong to the prior art relevant to the present application. The above background art shall not be used to evaluate the novelty and inventiveness of the present application without any explicit evidence showing that the above content has been disclosed before the filing date of the present application.

SUMMARY OF THE INVENTION

In the light of the aforementioned current situation of conventional skill, the present invention hereby provides a novel ultrasonic transducer, featuring the acoustic matching layer with a first resonant matching part and a second resonant matching part in different thicknesses to match different resonant frequencies of piezoelectric element.

One objective of the present invention is to provide an ultrasonic transducer, including a piezoelectric element with radial resonant frequencies and thickness resonant frequencies, and with an upper surface and a lower surface opposite to each other through the piezoelectric element and a lateral surface connecting the upper surface and the lower surface, and an acoustic matching layer set on the upper surface of the piezoelectric element and having a first resonant matching part and a second resonant matching part, wherein a thickness of the first resonant matching part in a direction perpendicular to the upper surface is greater than a thickness of the second resonant matching part in the direction, and the thickness of the first resonant matching part matches one of the radial resonant frequencies of the piezoelectric element and the thickness of the second resonant matching part matches another radial resonant frequency or one of the thickness resonant frequencies of the piezoelectric element.

Another objective of the present invention is to provide an ultrasonic transducer, including a piezoelectric element with an upper surface and a lower surface opposite to each other through the piezoelectric element and a lateral surface connecting the upper surface and the lower surface, and a carrier with an inner surface and an outer surface opposite to each other through the carrier, wherein the upper surface of the piezoelectric element is connected with the inner surface of the carrier and has bending resonant frequencies and thickness resonant frequencies, and an acoustic matching layer connected with the outer surface of the carrier and having a first resonant matching part and a second resonant matching part, wherein a thickness of the first resonant matching part in a direction perpendicular to the outer surface is greater than a thickness of the second resonant matching part in the direction, and the thickness of the first resonant matching part matches one of the bending resonant frequencies formed by the piezoelectric element and carrier, and the thickness of the second resonant matching part matches another bending resonant frequency or one of the thickness resonant frequencies formed by the piezoelectric element and the carrier.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the embodiments, and are incorporated in and constitute a part of this specification. The drawings illustrate some of the embodiments and, together with the description, serve to explain their principles. In the drawings.

It should be noted that all the figures are diagrammatic. Relative dimensions and proportions of parts of the drawings have been shown exaggerated or reduced in size, for the sake of clarity and convenience in the drawings. The same reference signs are generally used to refer to corresponding or similar features in modified and different embodiments.

DETAILED DESCRIPTION

In following detailed description of the present invention, reference is made to the accompanying drawings which form a part hereof and is shown by way of illustration and specific embodiments in which the invention may be practiced. These embodiments are described in sufficient details to enable those skilled in the art to practice the invention. Dimensions and proportions of certain parts of the drawings may have been shown exaggerated or reduced in size, for the sake of clarity and convenience in the drawings. Other embodiments may be utilized and structural, logical, and electrical changes may be made without departing from the scope of the present invention. The following detailed description, therefore, is not to be taken in a limiting sense, and the scope of the present invention is instead defined by the appended claims.

Figure 1:
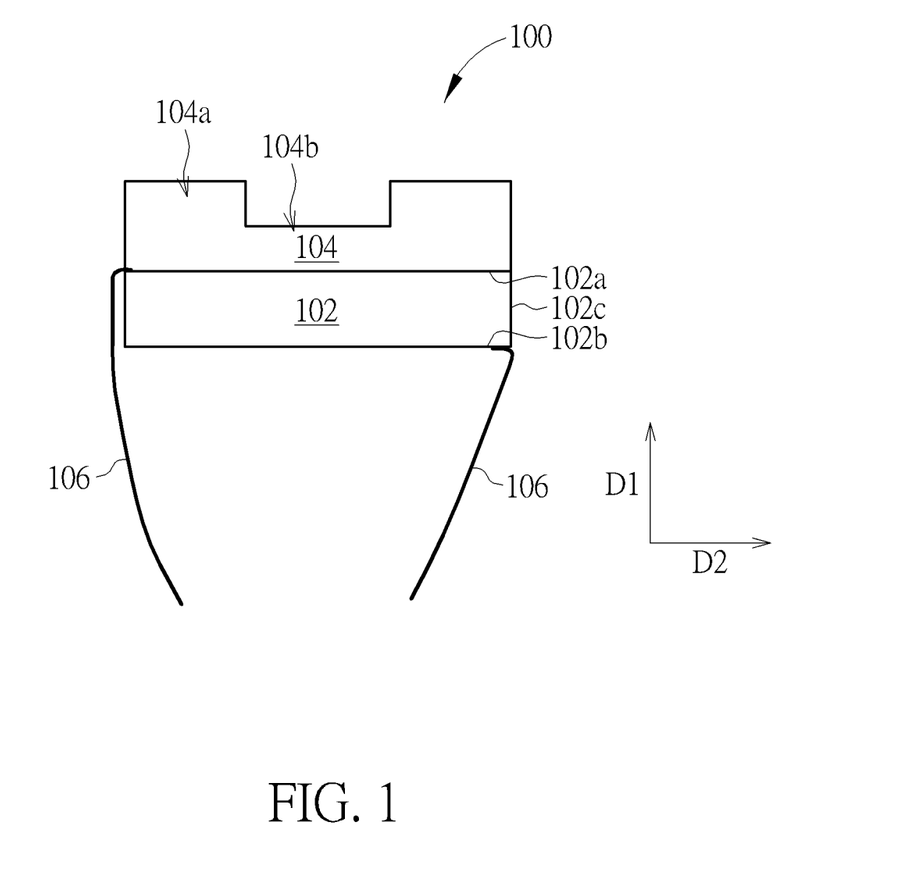
FIG. 1 is a cross-sectional view illustrating one mode of the ultrasonic transducer in accordance with the preferred embodiment of the present invention.

First, please refer to FIG. 1, which is a cross-sectional view illustrating one mode of the ultrasonic transducer 100 in accordance with one embodiment of the present invention. In this embodiment, the ultrasonic transducer 100 includes a piezoelectric element 102 with a first surface 102a, a second surface 102b opposite to the first surface 102a across the piezoelectric element 102 and a lateral surface 102c connecting the first surface 102a and the second surface 102b. The piezoelectric element 102 may include solid piezoelectric material in the shape of square, polygon or circle, or annular piezoelectric material, or piezoelectric material made of multilayer ceramic processing, or a piezoelectric material with grooves. These piezoelectric materials may include leaded piezoelectric material like $Pb(ZrTi)O_3$, $PbTiO_3$, or lead-free piezoelectric material like $BaTiO_3$, $(NaK)NbO_3$, with an acoustic impedance about 30-35 MRayl, much greater than the acoustic impedance of air (about 430 Rayl), thus an acoustic matching layer is required to match the acoustic impedances in these two mediums. The conductive layer on the piezoelectric element 102 may be connected with conductive wires 106 to electrically connect external high-frequency alternating current signal to the piezoelectric element 102 and generate high-frequency vibration in order to emit ultrasonic waves. In the embodiment of present invention, an acoustic matching layer 104 is set on the upper surface 102a of the piezoelectric element 102 and directly contacts therewith. Generally, the thickness of acoustic matching layer 104 in a direction perpendicular to the upper surface 102a of the piezoelectric element 102 (the first direction D1, i.e. thickness direction n or axial direction) is approximately equal to ¼ wavelength of the ultrasonic wave emitted by the piezoelectric element 102 in the acoustic matching layer 104 at an operating frequency, so as to achieve optimal ultrasonic transmission.

Nevertheless, common piezoceramics may have different resonant modes in different settings, for example radial resonant mode or thickness resonant mode. The ultrasonic wave emitted by piezoceramics in these different modes has different resonant frequencies. Please refer to FIG. 2, which is a graph of impedance (Ω) versus frequency (kHz) in different resonant modes of a piezoelectric element 102 in accordance with one embodiment of the present invention. It can be seen from the figure that, when the piezoelectric element 102 is powered on and generates high-frequency vibration, it has different impedances in different vibration frequencies. Lower impedance represents the piezoelectric element 102 producing higher energy effectiveness in the vibration at said frequency, i.e. stable resonant state. Take the curve in the figure for an example, the piezoelectric element 102 achieves a relatively low impedance in a resonance at a lower frequency of 50 kHz, wherein it is in a radial resonant mode at this time with a considerable portion of its resonant force transmitting in a radial direction (i.e. second direction D2) of the piezoelectric element 102. In another aspect, the piezoelectric element 102 may also achieve a relatively low impedance in a resonance at a higher frequency of 200 kHz, wherein it is in a thickness resonant mode (or referred as axial resonant mode) at this time with a considerable portion of its resonant force transmitting in the thickness direction (i.e. first direction D1) of the piezoelectric element 102. Generally, using an ultrasonic transducer with low-frequency resonance can increase detection range, but with larger blind zone and worse resolution. On the contrary, using an ultrasonic transducer with high-frequency resonance may result in a shorter detection range, but with smaller blind zone and better resolution.

Figure 2:
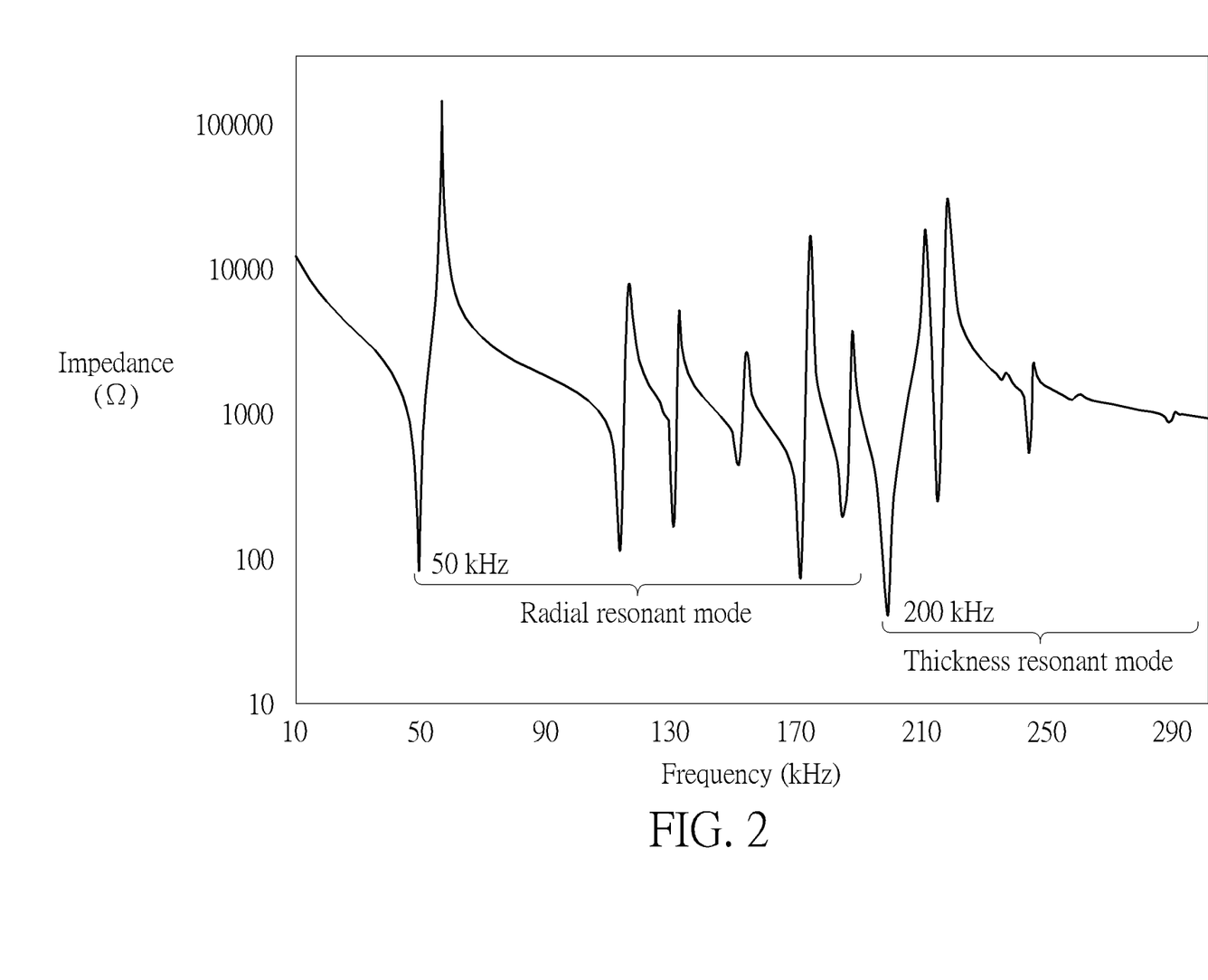
FIG. 2 is a graph of impedance (Ω) versus frequency (kHz) in different resonant modes of a piezoelectric element in accordance with the preferred embodiment of the present invention.

Since the piezoelectric element 102 is provided with properties in different resonant mode and these modes may be achieved through changing the frequency of applied power, thus we may decide to use which resonant mode of the piezoelectric element depending on the applications.

Although the piezoelectric element 102 may be operated in different resonant modes, different resonant modes are characterized by different resonant frequencies. Therefore, an acoustic matching layer with different thickness is required to match therewith. Refer back to FIG. 1. As shown in FIG. 1, the present invention features an acoustic matching layer 104 with different thicknesses. More specifically, the acoustic matching layer 104 of present invention is provided with a first resonant matching part 104a and a second resonant matching part 104b with different thicknesses, which match designedly and respectively with one radial resonant frequency and another radial resonant frequency or thickness resonant frequency of the piezoelectric element 102. From the profile of cross-section, the second resonant matching part 104b looks like a recess at the center of piezoelectric element 102, while the first resonant matching part 104a surrounds the second resonant matching part 104b. Since the radial resonant frequency of piezoelectric element 102 is lower (50 KHz), the ultrasonic wavelength emitted in this mode would be longer, thus it requires an acoustic matching layer with greater thickness. On the contrary, the thickness resonant frequency of piezoelectric element 102 is higher (200 kHz), the ultrasonic wavelength emitted in this mode would be shorter, thus it requires an acoustic matching layer with lesser thickness. In the embodiment, the thickness of first resonant matching part 104a matches the radial resonant frequency of piezoelectric element 102, while the thickness of second resonant matching part 104b matches another radial resonant frequency or a thickness resonant frequency of the piezoelectric element 102.

The material of acoustic matching layer 104 may be organic polymer materials or composite materials made of organic polymer materials mixing with hollow particles or solid particles. The organic polymer material includes epoxy, vinyl ester resin, acrylic resin, polyurethane or UV resin. The hollow particles or solid particles may be hollow glass particles or solid glass particles, as a filler to be uniformly distributed in the organic polymer materials to adjust total density of the acoustic matching layer 104. The density of hollow glass particles is between 0.1 g/cm$^3$ to 0.6 g/cm$^3$. Since the acoustic impedance is proportional to the density of material, the lower the density of the acoustic matching layer 104 is, the lower the acoustic impedance is obtained, so that better acoustic matching may be achieved in the operation. The acoustic matching layer 104 may be modulated with different densities by adding the glass particles with different percentage by volume into the organic polymer materials and undergo mixing, degasing and curing treatment.

Figure 3:
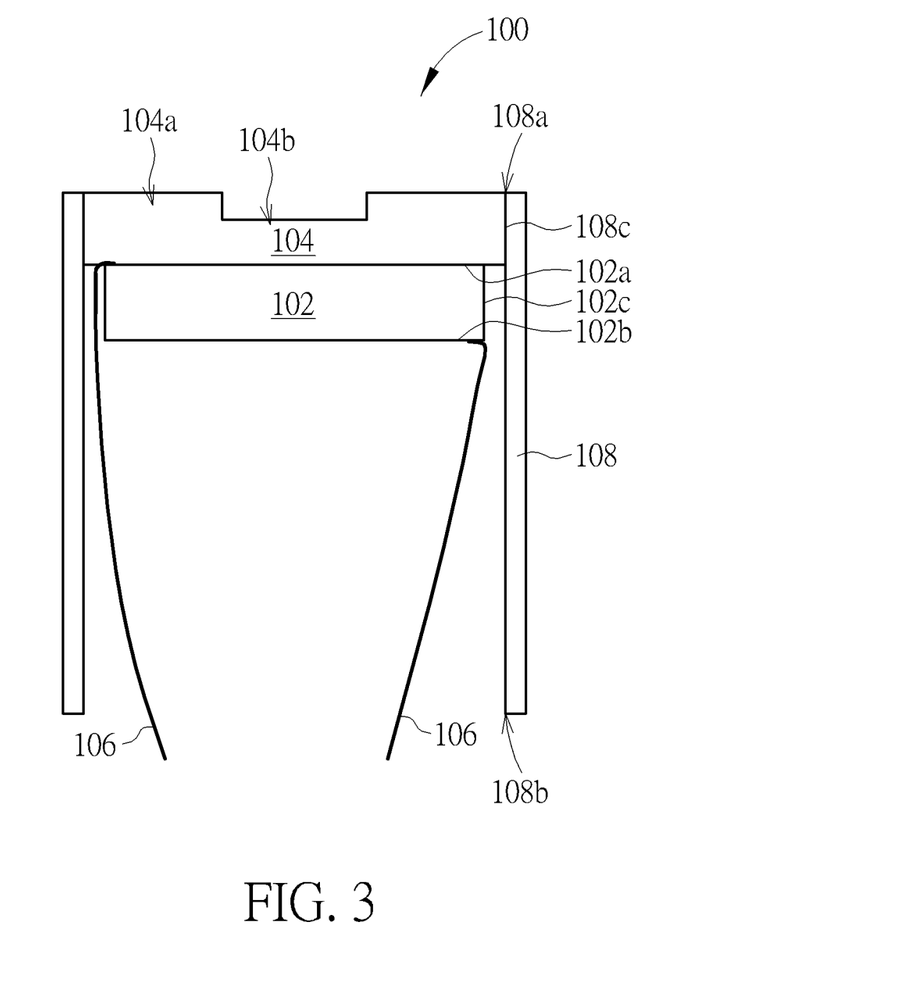
FIG. 3 is a cross-sectional view illustrating another mode of the ultrasonic transducer in accordance with one embodiment of the present invention.

Please refer now to FIG. 3, which is a cross-sectional view illustrating another mode of the ultrasonic transducer in accordance with one embodiment of the present invention. In this embodiment, the ultrasonic transducer 100 may be set in a tubular carrier 108. The tubular carrier 108 is provided with an upper opening 108a and a lower opening 108b, wherein the inner surface 108c of tubular carrier 108 surrounds the acoustic matching layer 104 and connects therewith. In other embodiment, the inner surface 108c of tubular carrier 108 may also connect with the piezoelectric element 102. The first resonant matching part 104a and the second resonant matching part 104b of the acoustic matching layer 104 are exposed from the upper opening 108a of tubular carrier 108, and the conductive wires 106 may extend out through the lower opening 108b of tubular carrier 108. The cross-section of tubular carrier 108 is in the shape of square, polygon or circle. The material of tubular carrier 108 may be selected from metal materials of following group or the combination thereof: aluminum (Al), titanium (Ti), copper (Cu), stainless steel, or is selected from non-metal materials of following group or the combination thereof: glass, acrylic, polytetrafluoroethylene (PTFE), polyvinylidene difluoride (PVDF), polypropylene (PP), polyethylene (PE), polyvinyl chloride (PVC), polybutylene terephthalate (PBT), acrylonitrile butadiene styrene (ABS), polyphenylene sulfide (PPS), liquid-crystal polymer (LCP) or polyether ether ketone (PEEK).

Figure 4:
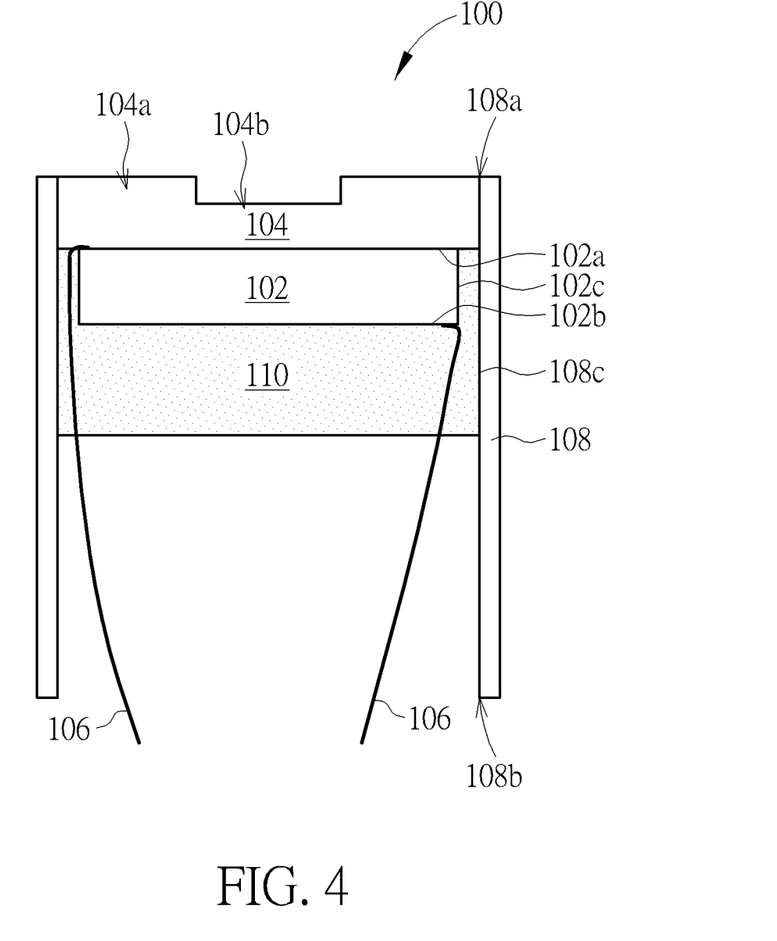
FIG. 4 is a cross-sectional view illustrating still another mode of the ultrasonic transducer in accordance with one embodiment of the present invention.

Refer now to FIG. 4, which is a cross-sectional view illustrating still another mode of the ultrasonic transducer in accordance with one embodiment of the present invention. In this embodiment, the ultrasonic transducer 100 may further include a damping element 110, which is connected with the lower surface 102b of piezoelectric element 102 and the inner surface 108c of tubular carrier 108. In this way, the damping element 110 may effectively buffer to lower the ringing of the ultrasonic transducer under high-frequency vibration in the operation of piezoelectric element 102. In other embodiment, it may also be provided with two damping elements with different damping coefficients or hardness to achieve better damping effect. The material of damping element 110 may be fibrous elastomer, including specifically silicone, rubber, ethylene vinyl acetate (EVA), styrene elastomer, polyester elastomer, olefin elastomer, thermoplastic vulcanized rubber (TPV), thermoplastic polyurethane (TPU), epoxy, wood cork, polyester staple, wool felt, glass fiber or foam.

Figure 5:
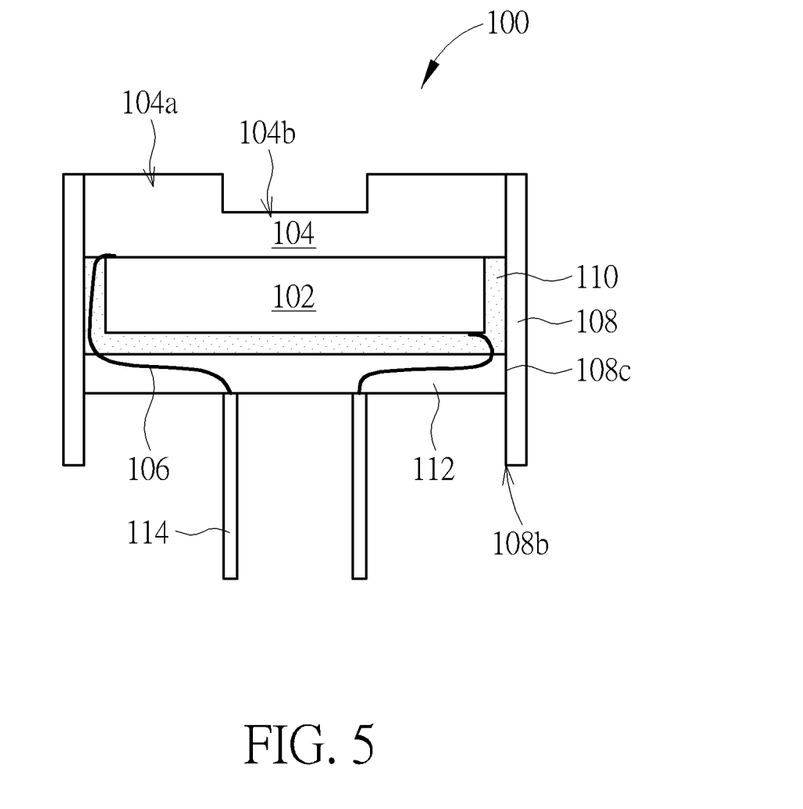
FIG. 5 is a cross-sectional view illustrating still another mode of the ultrasonic transducer in accordance with one embodiment of the present invention.

Refer now to FIG. 5, which is a cross-sectional view illustrating still another mode of the ultrasonic transducer in accordance with one embodiment of the present invention. In this embodiment, the ultrasonic transducer 100 may further include a carrier plate 112, with its upper surface connecting with the damping element 110 and its lateral surface connecting with the inner surface 108c of surrounding tubular carrier 108, so as to fix on the tubular carrier 108 and provide more stable supporting effect for the ultrasonic transducer 100. The carrier plate 112 is also provided with leads or pins 114, and the piezoelectric element 102 may be connected to these pins 114 of carrier plate 112 through the conductive wires 106 and be further led out through the lower opening of tubular carrier 108.

Figure 6:
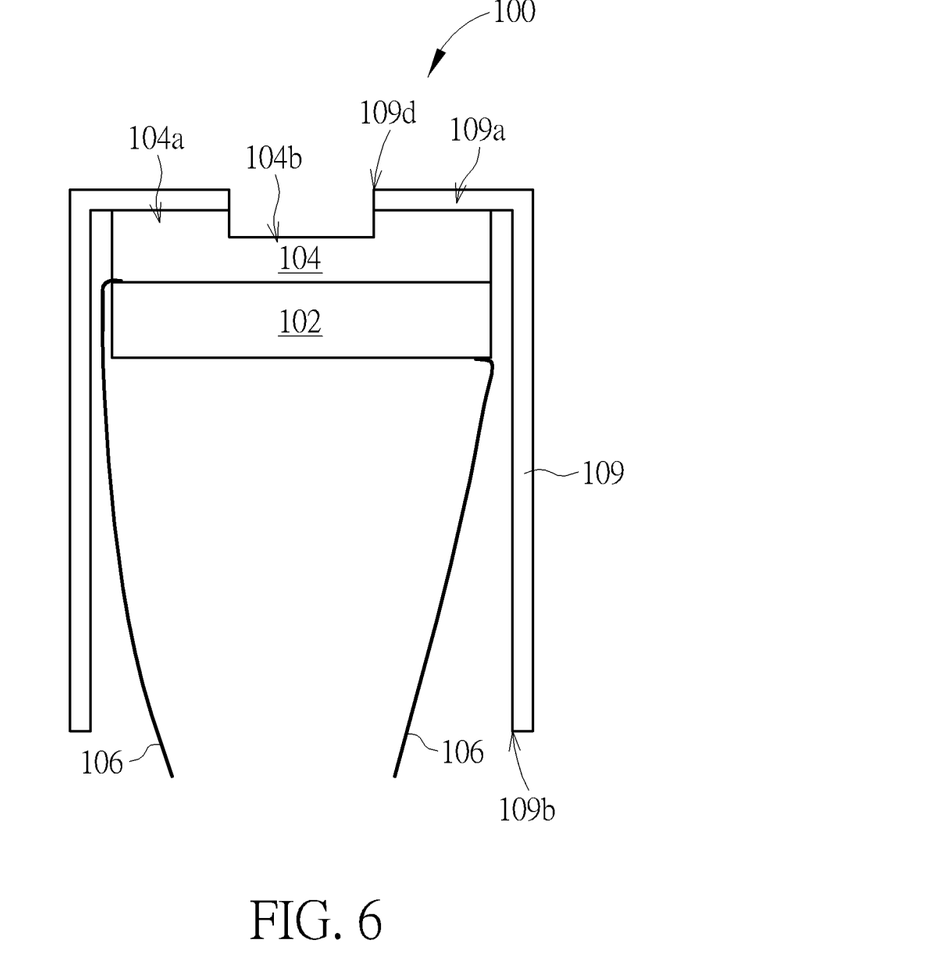
FIG. 6 is a cross-sectional view illustrating still another mode of the ultrasonic transducer in accordance with one embodiment of the present invention.

Refer now to FIG. 6, which is a cross-sectional view illustrating still another mode of the ultrasonic transducer in accordance with one embodiment of the present invention. Different from the aforementioned embodiment, the ultrasonic transducer 100 in this embodiment is set in a barrel-shaped carrier 109. The barrel-shaped carrier 109 is provided with a top 109a, a lower opening 109b and a body connecting the top 109a and the lower opening 109b. A hole 109d is further formed at the center of top 109a. The piezoelectric element 102 and the acoustic matching layer 104 are set in the barrel-shaped carrier 109, wherein the first resonant matching part 104a of acoustic matching layer 104 is connected with the inner surface of top 109a of the barrel-shaped carrier 109, while the second resonant matching part 104b is exposed from the hole 109d. The conductive wires 106 may extend out through the lower opening 109d of barrel-shaped carrier 109. The cross-section of barrel-shaped carrier 109 may be in the shape of square, polygon or circle. The material of barrel-shaped carrier 109 may be selected from metal materials of following group or the combination thereof: aluminum (Al), titanium (Ti), copper (Cu), stainless steel, or is selected from non-metal materials of following group or the combination thereof: glass, acrylic, polytetrafluoroethylene (PTFE), polyvinylidene difluoride (PVDF), polypropylene (PP), polyethylene (PE), polyvinyl chloride (PVC), polybutylene terephthalate (PBT), acrylonitrile butadiene styrene (ABS), polyphenylene sulfide (PPS), liquid-crystal polymer (LCP) or polyether ether ketone (PEEK).

Figure 7:
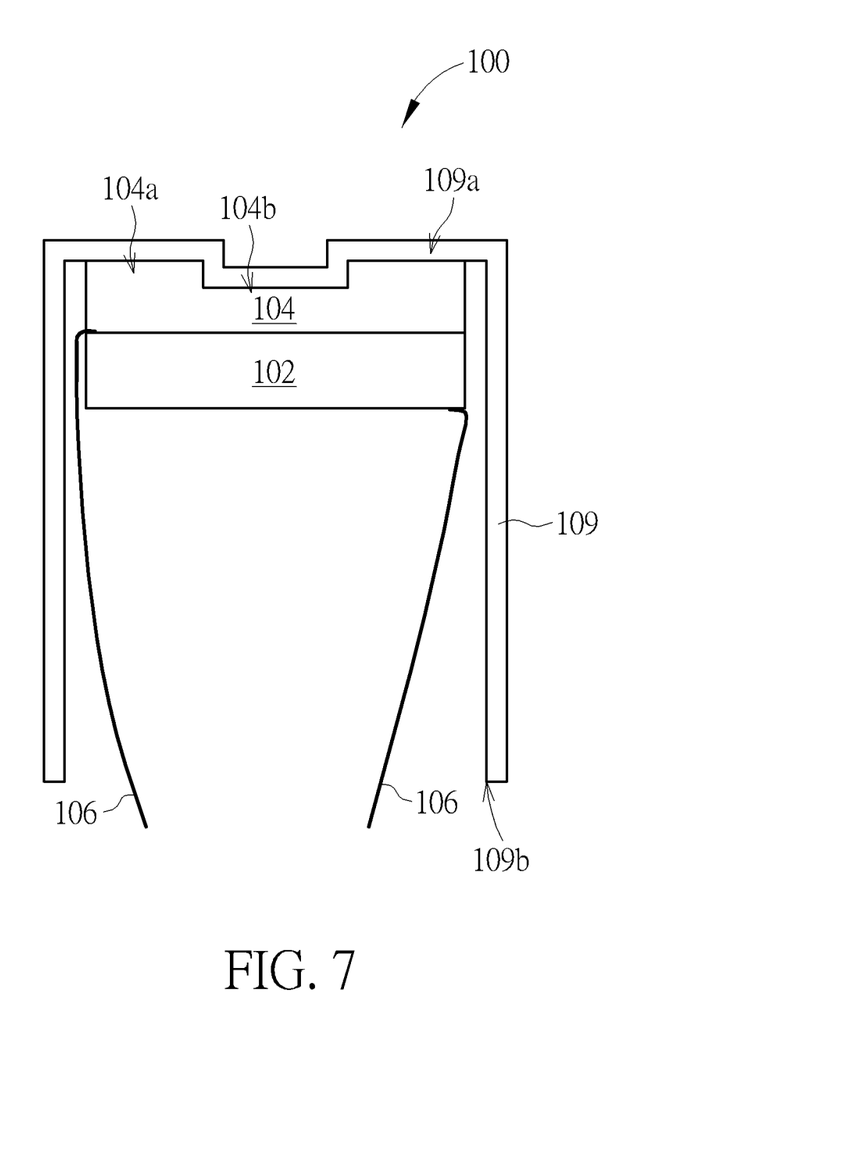
FIG. 7 is a cross-sectional view illustrating still another mode of the ultrasonic transducer in accordance with one embodiment of the present invention.

Refer now to FIG. 7, which is a cross-sectional view illustrating still another mode of the ultrasonic transducer in accordance with one embodiment of the present invention. In this embodiment, no hole is formed in the top 109a of barrel-shaped carrier 109, and the second resonant matching part 104b of acoustic matching layer 104 is also connected with the inner surface of top 109a of the barrel-shaped carrier 109. This design is more suitable for the ultrasonic transducer to be used in external harsh environment, to effectively protect the acoustic matching layers from damage.

Figure 8:
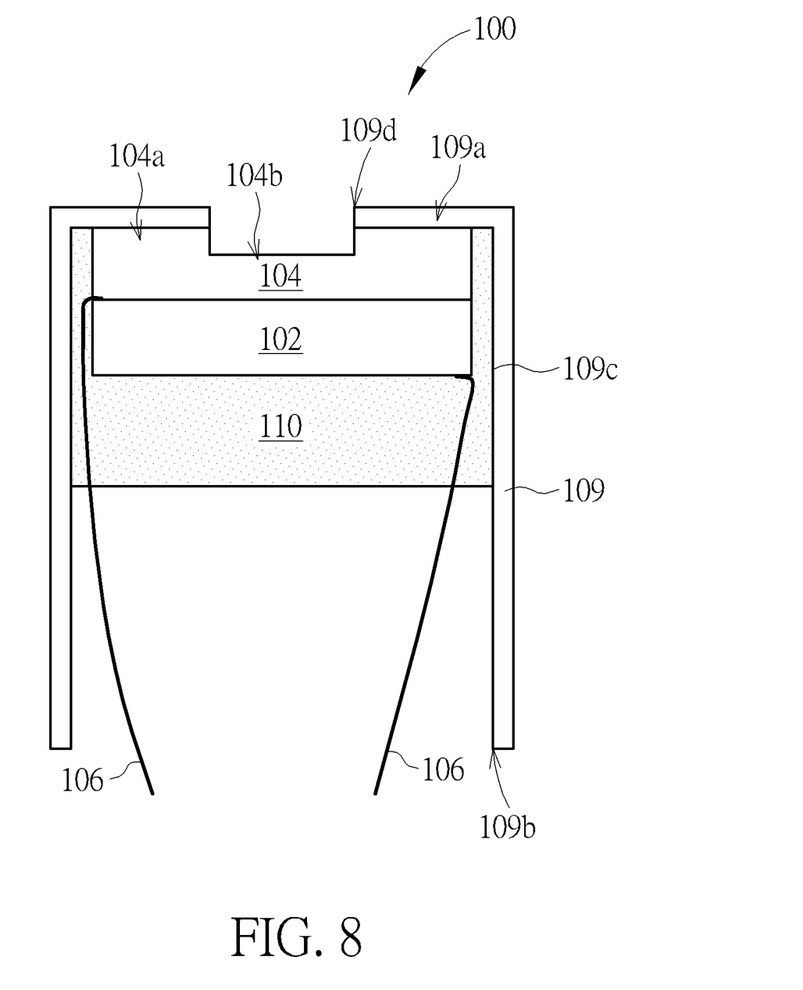
FIG. 8 is a cross-sectional view illustrating still another mode of the ultrasonic transducer in accordance with one embodiment of the present invention.

Please refer now to FIG. 8, which is a cross-sectional view illustrating still another mode of the ultrasonic transducer in accordance with one embodiment of the present invention. In this embodiment, the ultrasonic transducer 100 may further include a damping element 110, which is connected with the lower surface 102b of piezoelectric element 102 and the inner surface 109c of barrel-shaped carrier 109 and further fills up the space between the piezoelectric element 102, the acoustic matching layer 104 and the barrel-shaped carrier 109. In this way, the damping element 110 may effectively buffer to lower the ringing of the ultrasonic transducer under high-frequency vibration in the operation of piezoelectric element 102. In other embodiment, it may also be provided with two damping elements with different damping coefficients or hardness to achieve better damping effect. The material of damping element 110 may be fibrous elastomer, including specifically silicone, rubber, ethylene vinyl acetate (EVA), styrene elastomer, polyester elastomer, olefin elastomer, thermoplastic vulcanized rubber (TPV), thermoplastic polyurethane (TPU), epoxy, wood cork, polyester staple, wool felt, glass fiber or foam.

Figure 9:
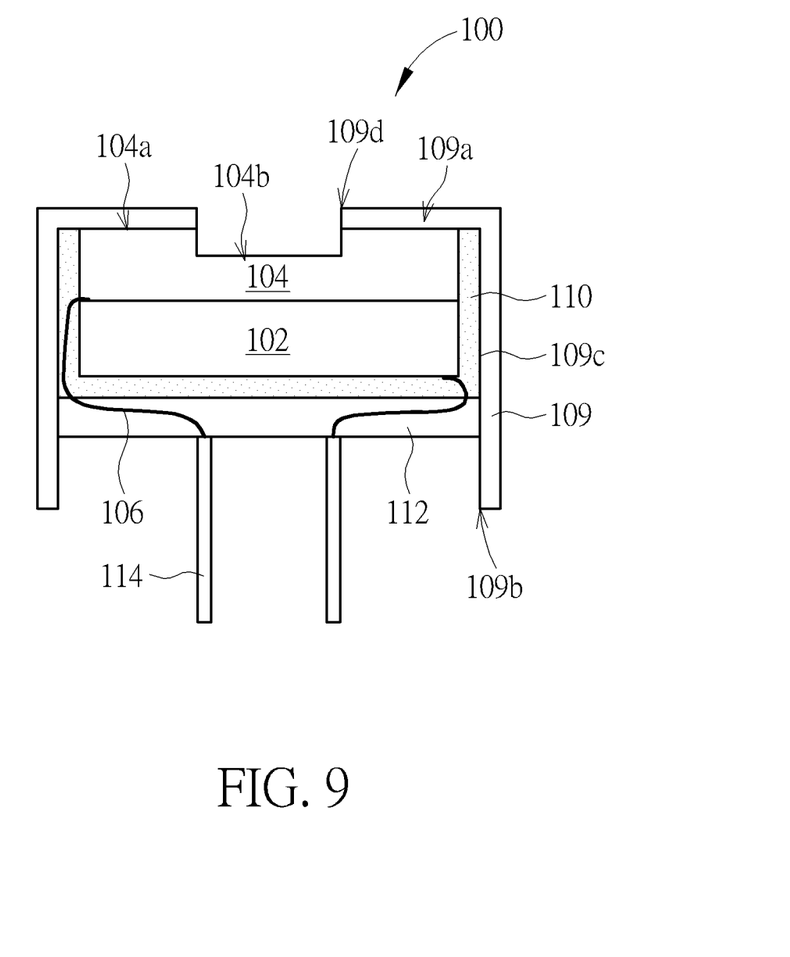
FIG. 9 is a cross-sectional view illustrating still another mode of the ultrasonic transducer in accordance with one embodiment of the present invention.

Refer now to FIG. 9, which is a cross-sectional view illustrating still another mode of the ultrasonic transducer in accordance with one embodiment of the present invention. In this embodiment, the ultrasonic transducer 100 may further include a carrier plate 112, with its upper surface connecting with the damping element 110 and its lateral surface connecting with the inner surface 109c of surrounding barrel-shaped carrier 109, so as to fix on the barrel-shaped carrier 109 and provide more stable supporting effect for the ultrasonic transducer 100. The carrier plate 112 is also provided with leads or pins 114, and the piezoelectric element 102 may be connected to these pins 114 of carrier plate 112 through the conductive wires 106 and be further led out through the lower opening 109b of barrel-shaped carrier 109.

Figure 10:
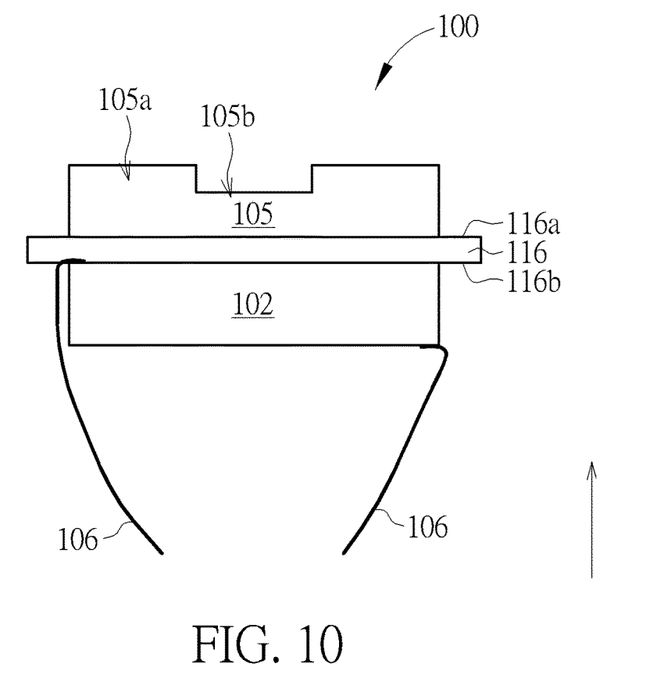
FIG. 10 is a cross-sectional view illustrating still another mode of the ultrasonic transducer in accordance with one embodiment of the present invention.

Refer now to FIG. 10, which is a cross-sectional view illustrating still another mode of the ultrasonic transducer in accordance with one embodiment of the present invention. Different from the aforementioned embodiments, the piezoelectric element in this embodiment is not directly connected with the acoustic matching layer. As shown in FIG. 9, the ultrasonic transducer 100 includes a carrier 116. The carrier 116 is provided with an inner surface 116b and an outer surface 116a opposite to each other through the carrier 116, and the piezoelectric element 102 is set on the inner surface 116b of carrier 116, while the acoustic matching layer 105 is set on the outer surface 116a of carrier 116, wherein the area of carrier 116 is larger than the area of connecting plane between the piezoelectric element 102 and the acoustic matching layer 105. A part of the carrier 116 extends outwardly from the periphery. In this kind of setting, since the piezoelectric element 102 is not directly connected with the acoustic matching layer 105 and a flat carrier 116 is interfacing therebetween, the original, low-frequency radial resonant mode of the piezoelectric element 102 is changed into a bending resonant mode, wherein a considerable portion of its resonant force at this time is transmitted to the connected carrier 116 and make it bending and vibrating. In this way, the piezoelectric element 102 is changed and provided with relatively low bending resonant frequencies and relatively high thickness resonant frequencies, and the acoustic matching layer 105 is provided with a relatively thick first resonant matching part 105a and a relatively thin second resonant matching part 105b, which match designedly and respectively with one of the bending resonant frequency and another bending resonant frequency or thickness resonant frequency of the piezoelectric element 102. The material of carrier 116 may be selected from metal materials of following group or the combination thereof: aluminum (Al), titanium (Ti), copper (Cu), stainless steel, or is selected from non-metal materials of following group or the combination thereof: glass, acrylic, polytetrafluoroethylene (PTFE), polyvinylidene difluoride (PVDF), polypropylene (PP), polyethylene (PE), polyvinyl chloride (PVC), polybutylene terephthalate (PBT), acrylonitrile butadiene styrene (ABS), polyphenylene sulfide (PPS), liquid-crystal polymer (LCP) or polyether ether ketone (PEEK).

Figure 11:
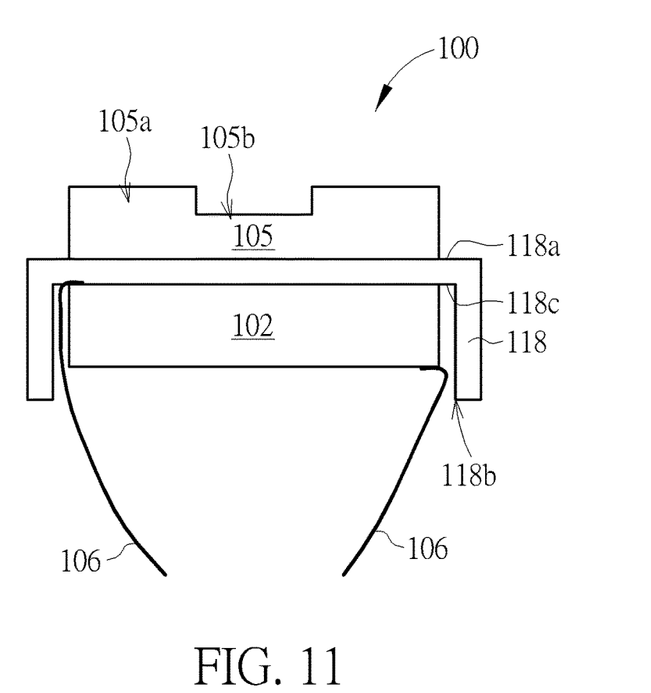
FIG. 11 is a cross-sectional view illustrating still another mode of the ultrasonic transducer in accordance with one embodiment of the present invention.

Please refer now to FIG. 11, which is a cross-sectional view illustrating still another mode of the ultrasonic transducer in accordance with one embodiment of the present invention. Different from the aforementioned embodiment, the carrier in this embodiment is a barrel-shaped carrier 118 rather than a flat carrier 116. The barrel-shaped carrier 118 is provided with an outer surface 118a and an opposite inner surface 118c. The piezoelectric element 102 is set inside the barrel-shaped carrier 118 and is connected with the inner surface 118c thereof, while the acoustic matching layer 105 is set outside the barrel-shaped carrier 118 and is connected with the outer surface 118a thereof. This design is suitable for the case that the barrel-shaped carrier is required to provide protection and the acoustic matching layer is used to provide acoustic matching.

According to the modes of the ultrasonic transducers provided in the aforementioned embodiments, it may be clearly understood that the design of the acoustic matching layer with different thicknesses may properly match the resonant modes of the piezoelectric element in different settings, and may be compatible to both the applications of barrel-shaped carrier and flat carrier.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An ultrasonic transducer, comprising:
a piezoelectric element with radial resonant frequencies and thickness resonant frequencies and with an upper surface and a lower surface opposite to each other through said piezoelectric element and a lateral surface connecting said upper surface and said lower surface; and
an acoustic matching layer set on said upper surface of said piezoelectric element and having a first resonant matching part and a second resonant matching part, wherein said second resonant matching part is at a center of said upper surface of said piezoelectric ele- ment and said first resonant matching part surrounds said second resonant matching part on said upper surface of said piezoelectric element, and a thickness of said first resonant matching part in a direction perpendicular to said upper surface is greater than a thickness of said second resonant matching part in said direction, and said thickness of said first resonant matching part matches one of said radial resonant frequencies of said piezoelectric element and said thickness of said second resonant matching part matches another said radial resonant frequency or one of said thickness resonant frequencies of said piezoelectric element.

2. The ultrasonic transducer of claim 1, wherein said radial resonant frequencies are less than said thickness resonant frequencies.

3. The ultrasonic transducer of claim 1, further comprising a tubular carrier, wherein said tubular carrier is provided with an upper opening and lower opening, and said piezoelectric element and said acoustic matching layer are set in said tubular carrier, and said acoustic matching layer is exposed from said upper opening of said tubular carrier.

4. The ultrasonic transducer of claim 3, further comprising a damping element, wherein said damping element is connected with said lower surface of said piezoelectric element and an inner surface of said tubular carrier.

5. The ultrasonic transducer of claim 4, further comprising a carrier plate, wherein said carrier plate is provided with leads or pins, and said carrier plate and said damping element are connected with each other and exposed from said lower opening of said tubular carrier.

6. The ultrasonic transducer of claim 3, wherein said tubular carrier includes a tubular structure with a cross-section in the shape of square, polygon or circle.

7. The ultrasonic transducer of claim 3, wherein a material of said tubular carrier is selected from metal materials of following group or the combination thereof: aluminum, titanium, copper, stainless steel, or is selected from non-metal materials of following group or the combination thereof: glass, acrylic, polytetrafluoroethylene (PTFE), polyvinylidene difluoride (PVDF), polypropylene (PP), polyethylene (PE), polyvinyl chloride (PVC), polybutylene terephthalate (PBT), acrylonitrile butadiene styrene (ABS), polyphenylene sulfide (PPS), liquid-crystal polymer (LCP) or polyether ether ketone (PEEK).

8. The ultrasonic transducer of claim 1, wherein said acoustic matching layer comprises organic polymer materials or comprises a composite material made of said organic polymer materials mixing with hollow particles or solid particles, and said organic polymer material comprises epoxy, vinyl ester resin, UV resin, polyurethane, silicone, acrylic resin or cyanate ester resin, and said first resonant matching part and said second resonant matching part of said acoustic matching layer comprise the same material or different material.

9. The ultrasonic transducer of claim 1, wherein said piezoelectric element comprises solid piezoelectric material in a shape of square, polygon or circle, or annular piezoelectric element, or multilayer ceramic piezoelectric material, or a piezoelectric material with grooves.

10. The ultrasonic transducer of claim 1, further comprises a barrel-shaped carrier, wherein said barrel-shaped carrier is provided with a closed top, a lower opening and a body connecting said top and said lower opening, and said piezoelectric element and said acoustic matching layer are set in said barrel-shaped carrier, and said first resonant matching part and said second resonant matching part of said acoustic matching layer are connected with said closed top of said barrel-shaped carrier.

11. The ultrasonic transducer of claim 1, further comprising a barrel-shaped carrier, wherein said barrel-shaped carrier is provided with a top, a lower opening and a body connecting said top and said lower opening, and said top is provided with a hole, and said piezoelectric element and said acoustic matching layer are set in said barrel-shaped carrier, wherein said first resonant matching part of said acoustic matching layer is connected with said top of said barrel-shaped carrier, and said second resonant matching part of said acoustic matching layer is exposed from said hole of said top.

12. The ultrasonic transducer of claim 11, further comprising a damping element, wherein said damping element and said lower surface of said piezoelectric element are connected with an inner surface of said body.

13. The ultrasonic transducer of claim 12, further comprising a carrier plate, wherein said carrier plate is provided with leads or pins, and said carrier plate is connected with said damping element and an inner surface of said body and is exposed from said lower opening of said barrel-shaped carrier.

14. The ultrasonic transducer of claim 11, wherein a cross-section of said barrel-shaped carrier is in the shape of square, polygon or circle.

15. The ultrasonic transducer of claim 11, wherein a material of said barrel-shaped carrier is selected from metal materials of following group or the combination thereof: aluminum, titanium, copper, stainless steel, or is selected from non-metal materials of following group or the combination thereof: glass, acrylic, polytetrafluoroethylene (PTFE), polyvinylidene difluoride (PVDF), polypropylene (PP), polyethylene (PE), polyvinyl chloride (PVC), polybutylene terephthalate (PBT), acrylonitrile butadiene styrene (ABS), polyphenylene sulfide (PPS), liquid-crystal polymer (LCP) or polyether ether ketone (PEEK).

16. An ultrasonic transducer, comprising:
a piezoelectric element with an upper surface and a lower surface opposite to each other through said piezoelectric element and a lateral surface connecting said upper surface and said lower surface;
a carrier with an inner surface and an outer surface opposite to each other through said carrier, wherein said upper surface of said piezoelectric element is connected with said inner surface of said carrier and has bending resonant frequencies and thickness resonant frequencies; and
an acoustic matching layer connected with said outer surface of said carrier and having a first resonant matching part and a second resonant matching part, wherein said second resonant matching part is at a center of said upper surface of said piezoelectric element and said first resonant matching part surrounds said second resonant matching part on said upper surface of said piezoelectric element, and a thickness of said first resonant matching part in a direction perpendicular to said outer surface is greater than a thickness of said second resonant matching part in said direction, and said thickness of said first resonant matching part matches one of said bending resonant frequency formed by said piezoelectric element and carrier, and said thickness of said second resonant matching part matches another said bending resonant frequency or one of said thickness resonant frequency formed by said piezoelectric element and said carrier.

17. The ultrasonic transducer of claim 16, wherein said bending resonant frequencies are less than said thickness resonant frequencies.

18. The ultrasonic transducer of claim 16, wherein said carrier is flat carrier or barrel-shaped carrier.

19. The ultrasonic transducer of claim 16, wherein a material of said carrier is selected from metal materials of following group or the combination thereof: aluminum, titanium, copper, stainless steel, or is selected from non-metal materials of following group or the combination thereof: glass, acrylic, polytetrafluoroethylene (PTFE), polyvinylidene difluoride (PVDF), polypropylene (PP), polyethylene (PE), polyvinyl chloride (PVC), polybutylene terephthalate (PBT), acrylonitrile butadiene styrene (ABS), polyphenylene sulfide (PPS), liquid-crystal polymer (LCP) or polyether ether ketone (PEEK).

20. The ultrasonic transducer of claim 16, wherein said acoustic matching layer comprises organic polymer materials or comprises a composite material made of said organic polymer materials mixing with hollow particles or solid particles, and said organic polymer material comprises epoxy, vinyl ester resin, UV resin, polyurethane, silicone, acrylic resin or cyanate ester resin, and said first resonant matching part and said second resonant matching part of said acoustic matching layer comprise the same material or different material.

\* \* \* \* \*